United States Patent
Caskey et al.

(10) Patent No.: US 8,918,308 B2
(45) Date of Patent: Dec. 23, 2014

(54) PROVIDING MULTI-LINGUAL SEARCHING OF MONO-LINGUAL CONTENT

(75) Inventors: Sasha P. Caskey, New York, NY (US); Rick A. Hamilton, II, Charlottesville, VA (US); Dimitri Kanevsky, Ossining, NY (US); Tara N. Sainath, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 13/543,008

(22) Filed: Jul. 6, 2012

(65) Prior Publication Data

US 2014/0012563 A1 Jan. 9, 2014

(51) Int. Cl.
*G06F 17/00* (2006.01)

(52) U.S. Cl.
USPC .................................. 704/2; 704/8

(58) Field of Classification Search
CPC .............................. G06F 17/289; G06F 17/275
USPC .............................................. 704/2, 8
See application file for complete search history.

(56) References Cited

U.S. PATENT DOCUMENTS

| | | | |
|---|---|---|---|
| 6,275,789 B1* | 8/2001 | Moser et al. | 704/7 |
| 6,292,772 B1* | 9/2001 | Kantrowitz | 704/9 |
| 6,388,686 B1* | 5/2002 | Hetherington et al. | 715/810 |
| 6,496,844 B1* | 12/2002 | Hetherington et al. | 715/236 |
| 7,099,876 B1* | 8/2006 | Hetherington et al. | 1/1 |
| 7,580,830 B2 | 8/2009 | Al-Onaizan et al. | |
| 7,835,903 B2 | 11/2010 | Datta | |
| 8,332,205 B2* | 12/2012 | Krishnan et al. | 704/4 |
| 8,364,462 B2* | 1/2013 | Joy et al. | 704/2 |
| 8,554,537 B2* | 10/2013 | Rai et al. | 704/2 |
| 2001/0029455 A1 | 10/2001 | Chin et al. | |
| 2005/0114145 A1* | 5/2005 | Janakiraman et al. | 704/277 |
| 2006/0112091 A1 | 5/2006 | Chapman et al. | |
| 2007/0288450 A1 | 12/2007 | Datta et al. | |
| 2008/0221866 A1 | 9/2008 | Katragadda et al. | |
| 2009/0326914 A1 | 12/2009 | Joy et al. | |
| 2010/0017382 A1 | 1/2010 | Katragadda et al. | |
| 2011/0137636 A1* | 6/2011 | Srihari et al. | 704/2 |
| 2011/0275037 A1* | 11/2011 | Alghamdi | 434/157 |
| 2012/0296627 A1* | 11/2012 | Suzuki et al. | 704/2 |
| 2012/0330990 A1* | 12/2012 | Chen et al. | 707/761 |
| 2013/0338996 A1* | 12/2013 | Katragadda et al. | 704/2 |

OTHER PUBLICATIONS

Androutsopoulos, J., "'Greeklish': Transliteration practice and Discourse in Context of Computer-Mediated Digraphia", Statdard Languages and Language Standards: Greek, Past and Gresent, 2009, pp. 221-249.

(Continued)

*Primary Examiner* — Michael N Opsasnick
(74) *Attorney, Agent, or Firm* — Lisa Ulrich; Roberts, Mlotkowski, Safran & Cole, P.C.

(57) ABSTRACT

Approaches for translating a transliterated search query are provided. An approach includes receiving a search query containing a transliterated word. The approach also includes determining a source language corresponding to the transliterated word. The approach further includes converting the transliterated word to a word in the source language. The approach additionally includes translating the word in the source language to a word in a target language. The approach also includes performing a search using the word in the target language.

19 Claims, 3 Drawing Sheets

(56) References Cited

OTHER PUBLICATIONS

Atkins-Kruger, A., "Google Rolls out Foreign Language Search Features Globally", http://www.multilingual-search.com/google-rolls-out-foreign-language-search-globally/10/12/2010/, Dec. 10, 2010, pp. 1-7.

"Google: Translate", http://www.google.com/language_tools, Google, Retrieved Jul. 6, 2012, 1 page.

"Google Transliteration (Formerly Google Indic Transliteration)", https://addons.mozilla.org/en-us/firefox/addon/google-transliteration-formerl/, Mozilla, Retrieved Jul. 6, 2012, pp. 1-3.

"Google Input Method: Type anywhere in your language", http://www.google.com/ime/transliteration/, Google IME, 2011, 1 page.

Durrani, N. et al., "Hindi-to-Urdu Machine Translation Through Transliteration", Proceedings of the 48th Annual meeting of the Association for Computational Linguistics, Jul. 11-16, 2010, pp. 465-474.

* cited by examiner

PROVIDING MULTI-LINGUAL SEARCHING OF MONO-LINGUAL CONTENT

TECHNICAL FIELD

The present invention relates generally to computer-based searching and, more particularly, to searching based on a transliterated search query.

BACKGROUND

Most computer-based search engines are indexed in the English language. However, a majority of the world population uses a language other than English as their primary language. A search engine that is indexed in English typically returns less than optimal results when a search query is presented in a non-English language form.

Languages are typically expressed in a specific writing system, e.g., a script, which is characterized by a particular alphabet. For example, words in the English language are written using the Latin alphabet, while words in the Russian language are written using the Cyrillic alphabet. Many alphabets include characters that are unique, e.g., marks and/or letters that are not included in other alphabets. Transliteration is the practice of using the script of one language to represent words that are normally written in the script of another language.

For example, a vast number of computer keyboards are based on the Latin alphabet, e.g., the conventional QWERTY keyboard. A user wishing to write a Russian word using a Latin alphabet keyboard is limited to the Latin characters that are available on the keyboard. As a result, the user typically uses the Latin characters to approximate the desired Russian word. The Russian word that is approximated using Latin characters is referred to as a transliteration and/or a transliterated word.

Search engines that receive a transliterated word as part of a search query typically seek an exact match of the transliterated word. This can produce less than optimal search results for the user.

SUMMARY

In a first aspect of the invention, a method is implemented in a computer infrastructure and includes receiving a search query containing a transliterated word. The method also includes determining a source language corresponding to the transliterated word. The method further includes converting the transliterated word to a word in the source language. The method additionally includes translating the word in the source language to a word in a target language. The method also includes performing a search using the word in the target language.

In another aspect of the invention, a system is implemented in hardware which includes a processor executing a translation engine that is operable to receive a search query containing a transliterated word. The processor is also operable to determine a source language corresponding to the transliterated word. The processor is further operable to convert the transliterated word to a word in the source language. The processor is additionally operable to translate the word in the source language to a word in a target language. The processor is also operable to submit the word in the target language to a search engine that is indexed in the target language. The processor is even further operable to receive search results in the target language, wherein the search results are based on the submitting the word in the target language to a search engine. The processor is still further operable to translate the search results in the target language to search results in the source language.

In an additional aspect of the invention, a computer program product includes a computer usable tangible storage medium having readable program code embodied in the tangible storage medium. The computer program product includes at least one component operable to: receive a search query from a user computer device, wherein the search query contains a transliterated word; determine a source language corresponding to the transliterated word; convert the transliterated word to a word in the source language; and translate the word in the source language to a word in a target language. The at least one component is further operable to: submit the word in the target language to a search engine; receive search results in the target language based on the submitting; translate the search results in the target language to search results in the source language; and transmit the search results in the source language to the user computer device.

In another aspect of the invention, there is a computer system for translating a transliterated search query. The system includes a CPU, a computer readable memory, and a computer readable storage media. The system also includes first program instructions to receive a search query containing a transliterated word. The system includes second program instructions to convert the transliterated word to a word in a source language. The system includes third program instructions to translate the word in the source language to a word in a target language. The system includes fourth program instructions to submit the word in the target language to a search engine that is indexed in the target language. The system includes fifth program instructions to receive search results in the target language based on the submitting. The first, second, third, fourth and fifth program instructions are stored on the computer readable storage media for execution by the CPU via the computer readable memory. Moreover, the converting the transliterated word to the word in the source language is based on visually analogous transliteration In a further aspect of the invention, there is a method of deploying a system for translating a transliterated search query. The method includes providing a computer infrastructure operable to: receive a search query from a user computer device, wherein the search query contains a transliterated word; determine a source language corresponding to the transliterated word by determining a weighted score for each one of a plurality of candidate languages; convert the transliterated word to a word in the source language; and translate the word in the source language to a word in a target language. The computer infrastructure is further operable to: submit the word in the target language to a search engine that is indexed in the target language; receive search results in the target language, wherein the search results are based on the submitting the word in the target language to a search engine; translate the search results in the target language to search results in the source language; and transmit the search results in the source language to the user computer device.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to computer-based searching and, more particularly, to searching based on a transliterated search query. According to aspects of the invention, a system operates to: receive a search query containing a transliteration; determine a source language word or phrase corresponding to the transliteration; translate the source language word or phrase to a target language; perform the search and obtain search results in the target language; and translate and display the search results in the source language. In embodiments, the source language is determined automatically from the transliterated word, without the user having to specify the source language. In additional embodiments, the source language word or phrase corresponding to the transliterated word is determined based on visually analogous characters rather than, or in addition to, phonetic/audible analogies. In this manner, the invention provides systems and methods for handling transliterated words contained in search queries.

Implementations of the invention allow the user to enter a search query in a source language (e.g., Russian) or a transliteration of the source language (e.g., one which uses a representation of the source language via symbols available in the input keyboard, e.g. English). The system detects the source language, converts the words into a target language, e.g., English, performs the search, and reports the results back to the user in the source language. The system may, in some embodiments, convert the response into the language the transliteration represents, e.g., the source language.

In various embodiments, either server-based or client-based translation may be employed. Furthermore, the techniques described herein may be used against search engine indices, typically compiled in English or other languages, instead of the page itself. In this manner, the searching may be performed through use of a commercially or privately available search engine.

Systems in accordance with aspects of the invention may be integrated into existing web portals by inclusion of a script in their template pages and allowing these portals to provide non-English access to information in a one step process, e.g., similar to how English-language users currently access information. Implementations of the invention provide an advantage over conventional systems that require users to translate queries themselves, conduct the search, translate the search results, and then translate the content of interest. Implementations of the invention provide a further advantage over conventional systems by allowing users to write in transliterated words, further facilitating their access to information.

In embodiments, the user's source language is automatically detected by the system rather than requiring the user to specify the source language. In embodiments, the automatic detection is accomplished using at least one of: detection of the user's environmental variables; location-based services; correlation of user-entered words against language-specific dictionaries; user profiles and histories; or more explicit user entry. Such methods allow for multiple people speaking different source languages to use the same search browser. For speech responsive systems, aspects of the invention also allow users to speak the search query in their source language.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
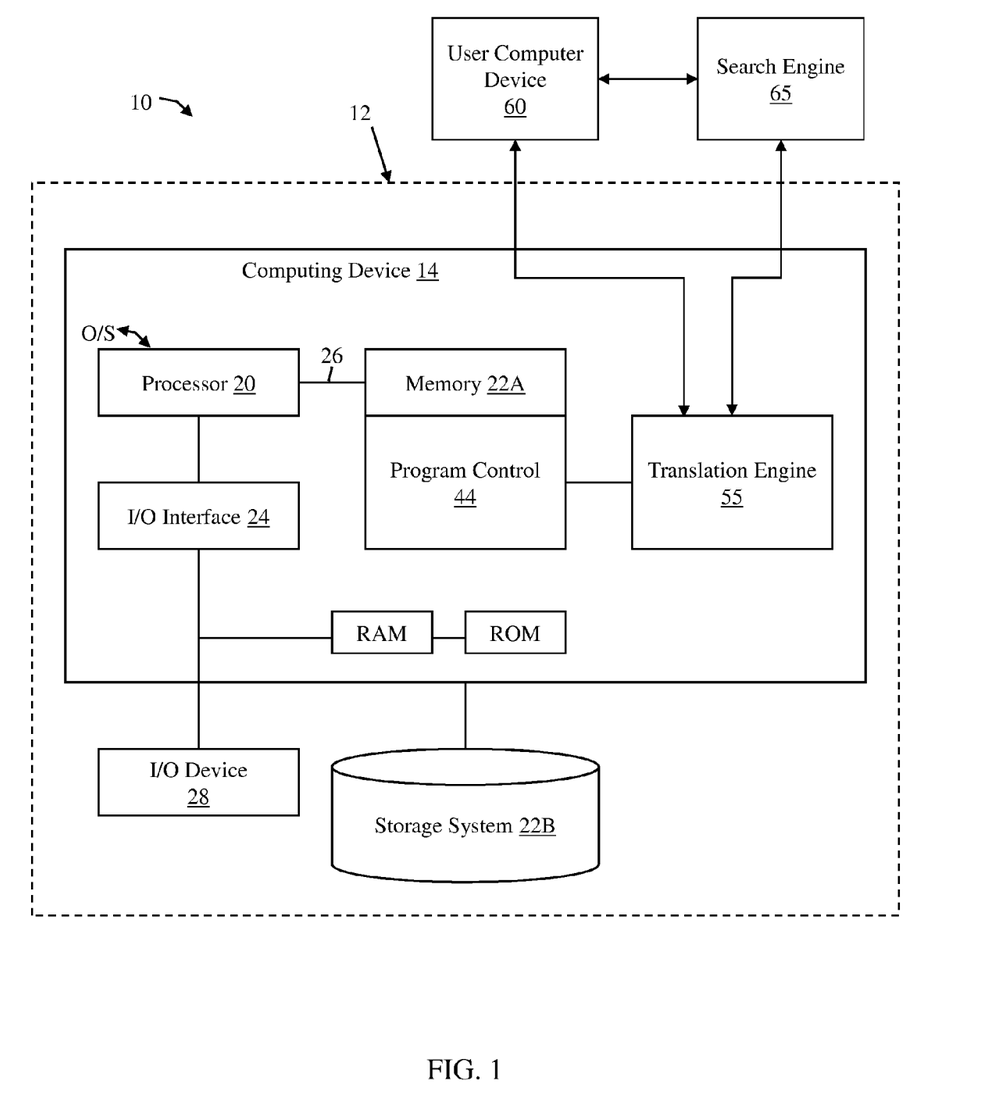
FIG. 1 shows an illustrative environment of a server and/or a computing device for implementing steps in accordance with aspects of the invention.

FIG. 1 shows an illustrative environment 10 for managing the processes in accordance with aspects of the invention. To this extent, the environment 10 includes a server or other computing infrastructure 12 that can perform the processes described herein. In particular, the computing infrastructure 12 includes a computing device 14. The computing device 14 can be resident on a network infrastructure or computing device of a third party service provider (any of which is generally represented in FIG. 1).

The computing device 14 includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be, for example, a handheld device, PDA, handset, keyboard, etc.

In general, the processor 20 executes computer program code (e.g., program control 44), which can be stored in the memory 22A and/or storage system 22B. Moreover, in accordance with aspects of the invention, the program control 44 controls a translation engine 55 that performs one or more of the processes described herein. In embodiments, the translation engine 55 operates to: receive a search query containing a transliteration; determine a source language word or phrase corresponding to the transliteration; translate the source language word or phrase to a target language; perform the search (or forward the search query to a search engine) to obtain search results in the target language; and translate and display the search results in the source language.

According to aspects of the invention, the translation engine 55 is in electronic communication with a user computer device 60 via a network connection. The user computer device 60 is any suitable computer device through which the user enters a search query, including but not limited to: a desktop computer, workstation, tablet computer, notebook computer, netbook computer, smartphone, etc. The user computer device 60 comprises an interface, such as a web browser, through which the user enters a search query. In conventional systems, a search query is transmitted from the user computer device 60 to a search engine 65, which compares the search query to indices and returns ranked results to the user computer device 60 based on the comparing.

In accordance with aspects of the invention, the translation engine 55 receives the search query from the user computer device 60, determines a source language of a transliterated word (or words) contained in the search query, translates the transliterated word (or words) to a target language, and provides the translated search query to the search engine 65. In embodiments, the target language is the language in which the search engine 65 stores its search indices (e.g., English). In one embodiment, the search engine 65 returns the search results directly to the user computer device 60 in the target language. In another embodiment, the translation engine 55 receives the search results from the search engine 65 in the target language (e.g., English), translates the search results to a source language (e.g., Russian) that corresponds to the transliterated word (or words) contained in the search query, and returns the translated search results to the user computer device 60 (e.g., in Russian).

The translation engine 55 may be separate from or integrated with the search engine 65. For example, the search engine 65 may be operated by a service provider, such as a conventional Internet-based search engine provider. In one embodiment, the translation engine 55 may be provided, controlled, operated, and/or maintained by the search engine provider. In another embodiment, the translation engine 55 is separate from the search engine 65, i.e., the translation engine 55 is provided, controlled, operated, and/or maintained by another service provider that is separate from the search engine provider.

Aspects of the invention may be implemented with an existing search engine 65 by, for example, including a script in their template pages that causes their existing web portals to accept transliterated inputs and forward the transliterated inputs to the translation engine 55 for handling in the manner described herein. For example, the script may cause the existing web portal to provide a check-box that the user may select to designate that a search query has a transliterated word or words. When the user checks the check-box and submits a search query, the system forwards the search query to the translation engine 55 for translating the transliterated word or words in accordance with processes described herein.

Still referring to FIG. 1, the translation engine 55 can be implemented as one or more program code in the program control 44 stored in memory 22A as separate or combined modules. Additionally, the translation engine 55 may be implemented as separate dedicated processors or a single or several processors to provide the function of this tool. Moreover, it should be understood by those of ordinary skill in the art that the translation engine 55 is used as a general descriptive term for providing the features and/or functions of the present invention, and that the translation engine 55 may comprise many different components.

As described herein, aspects of the invention involve computer-based searching based on automatic translation from a transliterated word input by a user. Transliteration typically uses phonetic/audible analogies in which words in the source language are written phonetically (e.g., as they sound) using an available keyboard characters in the target language. For example, the Russian word for "school" is ШКОЛА . The Cyrillic character "Ш" sounds similar to the sound made by the combination of Latin letters "sch". As such, a phonetically analogous transliteration of ШКОЛА . A using Latin characters may be "schkola".

Additionally or alternatively to accepting phonetically analogous transliteration, implementations of the invention also accommodate visually analogous transliteration. Generally speaking, visually analogous transliteration is transliteration in which the visual appearance of letters between the source and target languages is used to construct the transliterated word. Using the example of the Russian word ШКОЛА , it is seen that the Cyrillic character "Ш" is visually similar to the Latin letter "W". As such, a visually analogous transliteration of ШКОЛА using Latin characters may be "Wkola". In embodiments, the search query "Wkola" is recognized as a transliteration of the Russian word ШКОЛА A and is translated to the English word "school", which is then submitted to the search engine. The search engine performs the search based on comparing the English word "school" to the search indices and returns search results in English. The results may be displayed in English and/or translated to Russian and displayed in Russian.

In embodiments, upon receiving a search query with a transliterated word, the system automatically determines the source language associated with the transliterated word using parameters including at least one of: correlation of user-entered words against language-specific dictionaries; environmental variables; location-based services; and user profiles and/or histories. In accordance with aspects of the invention, the translation engine 55 uses these parameters (or other parameters) to determine respective probabilities that the transliterated word corresponds to each one of a plurality of candidate languages. The candidate language with the highest determined probability is selected as the source language for the transliterated word. The group of candidate languages may comprise any desired languages, including but not limited to: Amharic, Arabic, Bengali, Farsi (Persian), Greek, Gujarati, Hebrew, Hindi, Kannada, Malayalam, Marathi, Nepali, Oriya, Punjabi, Russian, Sanskrit, Serbian, Sinhalese, Tamil, Telugu, Tigrinya, and Urdu.

For example, the correlation of user-entered words against language-specific dictionaries may involve the translation engine 55 comparing the transliterated word to words contained in language-specific dictionaries of the plural candidate languages. A dictionary associated with each one of the candidate languages may be stored, for example, in storage system 22B of FIG. 1. In embodiments, the translation engine 55 may be programmed with logic to determine respective probabilities (e.g., weighted scores) that the user-entered transliterated word is associated with respective ones of plural candidate languages based on a relative degree to which the transliterated word matches or is similar to a word or words in respective ones of the language-specific dictionaries. For example, each one of the candidate languages may be assigned a first weighted score based on the comparison to language-specific dictionaries.

Environmental variables may include data that is available from the user's browser (e.g., Internet web browser program), such as languages supported and/or selected in the browser, languages of web-pages visited by the user in the past, cookies, etc. In order to protect user privacy, the user may volunteer or deny use of this data via their browser and/or device settings. In embodiments, the translation engine 55 may be programmed with logic to determine respective probabilities that the user's environmental variables are associated with respective ones of plural candidate languages. For example, each one of the candidate languages may be assigned a second weighted score based on the environmental variables.

In embodiments, each one of the plural candidate languages may be mapped to particular geographic locations. This mapping provides a link between the user's geographic location and the plural candidate languages. In embodiments, the translation engine 55 may be programmed with logic to determine respective probabilities that the user's geographic location is associated with respective ones of plural candidate languages. For example, each one of the candidate languages may be assigned a third weighted score based on the user's geographic location data. This feature may be provided using location-based services which may include geographic location data that is available from the user's computer device, such as Global Positioning System (GPS) location data, Internet Service Provider (ISP) location data, etc. In order to protect user privacy, the user may volunteer or deny use of this data via their browser and/or device settings.

User profile and/or history data may include other data associated with the user that can be logically associated with one or more of the candidate languages. For example, the user profile and/or history data may include a word or words that match a foreign language word in one of the language specific dictionaries. As another example, the user profile and/or history data may include a geographic/mailing address that can be correlated to one or more of the candidate languages via the mapping to particular geographic locations, described above. The invention is not limited to these two examples, and other examples of user profile and/or history data will be apparent to those of ordinary skill in the art. In order to protect user privacy, the user may volunteer or deny use of this data via their browser and/or device settings. In embodiments, the translation engine 55 may be programmed with logic to determine respective probabilities that the user's profile and/or history data is associated with respective ones of plural candidate languages. For example, each one of the candidate languages may be assigned a fourth weighted score based on the user's profile and/or history data.

In embodiments, the translation engine 55 combines the available weighted scores (e.g., at least one of the first, second, third, and fourth weighted score described above) for each one of the candidate languages to determine a respective overall score for each one of the respective candidate languages. The candidate language with the highest overall score is designated as the source language that corresponds to the user-entered transliterated word. In this manner, implementations of the invention automatically determine the source language associated with the transliterated word without the user having to specify the source language.

According to aspects of the invention, upon determining the source language for the user-entered transliterated word, the system automatically determines a word in the source language that corresponds to the transliterated word. In embodiments, this is accomplished based on at least one of visually analogous and phonetically analogous transliteration principles.

The visually analogous transliteration principles used in aspects of the invention may comprise comparing the shape of letters used in the transliterated word to the shape of letters associated with the selected source language. For example, the system may store or have access to a data structure associated with each one of the candidate languages, e.g., in storage system 22B. The data structure may contain data defining shapes of the individual characters used in the script of the candidate language (e.g., a dictionary that contains each character in the Cyrillic alphabet). In embodiments, the translation engine 55 may be programmed to compare the shape of individual letters of the transliterated word to letters contained in the data structure associated with the automatically determined source language. Based on relative degree of visual similarity, the translation engine 55 may determine a probability that a letter used in the transliterated word corresponds to a particular letter in the source language. This visual comparison process may be performed for each individual letter in the user-input transliterated word to determine a word in the source language corresponding to the transliterated word.

The visually analogous transliteration principles used in aspects of the invention may comprise machine learning. For example, the data structure for a particular candidate language may be updated each time the translation engine 55 performs a visual comparison of a letter of a user-input transliterated word. Additionally, one or more training groups of letters and/or words may be supplied to the translation engine 55, and the translation engine 55 may use one or more probabilistic training models in association with the training groups to determine probabilities that a letter in a first script (e.g., a particular Latin letter) corresponds to a letter in a second script (e.g., a particular Cyrillic letter). Using such machine learning techniques, the translation engine 55 may update the data structure associated with the Russian language to store data indicating that the Latin letter "W" corresponds to the Cyrillic character "Ш".

In further embodiments, the visually analogous transliteration principles described above may be combined with conventional phonetically analogous transliteration principles to determine a word in the source language that corresponds to the user-input transliterated word. For example, the translation engine 55 may be programmed to determine a first probability that a letter or group of letters in the transliterated word corresponds to a letter or group of letters in the source language based on visually analogous transliteration principles described above. The translation engine 55 may also be programmed to determine a second probability that the same letter or group of letters in the transliterated word corresponds to a letter or group of letters in the source language based on conventional phonetically analogous transliteration principles. The translation engine 55 may also be programmed to determine a composite probability based on the first and second probabilities, and use this composite probability in making the final determination as to which word in the source language corresponds to the user-input transliterated word. In this manner, the translation engine 55 would determine that a user input of "Wkola" or "schkola" or "shkola" would correspond to the Russian word ШКОЛА, which would be translated to the English word "school" for searching in an English-based search engine.

In accordance with aspects of the invention, the translation engine 55 may be configured to handle mixed search queries containing both transliterated and non-transliterated words. For example, the translation engine 55 may be programmed to recognize words in the search query that are already in the target language (e.g., using a target language dictionary), and to omit these words from the translation process.

In embodiments, the translation engine 55 may also be configured to translate search queries that contain plural transliterations associated with plural different source languages. For example, a search query may contain a word in the target language, a first transliterated word that corresponds to a first source language, and a second transliterated word that corresponds to a second source language that is different from the first source language. In such cases, the translation engine 55 separately analyzes and translates the first and second transliterated words to the target language.

According to further aspects of the invention, the translation engine 55 may be configured to accept search queries that are spoken in part or in whole, rather than typed. For example, the user computer device 60 may be equipped with dictation software that converts the user's speech to text. The textual output of the dictation software may be provided to the translation engine 55 in the same manner as if the user had typed a search query in a web browser portal.

While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the computing infrastructure 12 comprises two or more computing devices (e.g., a server cluster) that communicate over any type of communications link, such as a network, a shared memory, or the like, to perform the process described herein. Further, while performing the processes described herein, one or more computing devices on the computing infrastructure 12 can communicate with one or more other computing devices external to the computing infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Processes

Figure 2:
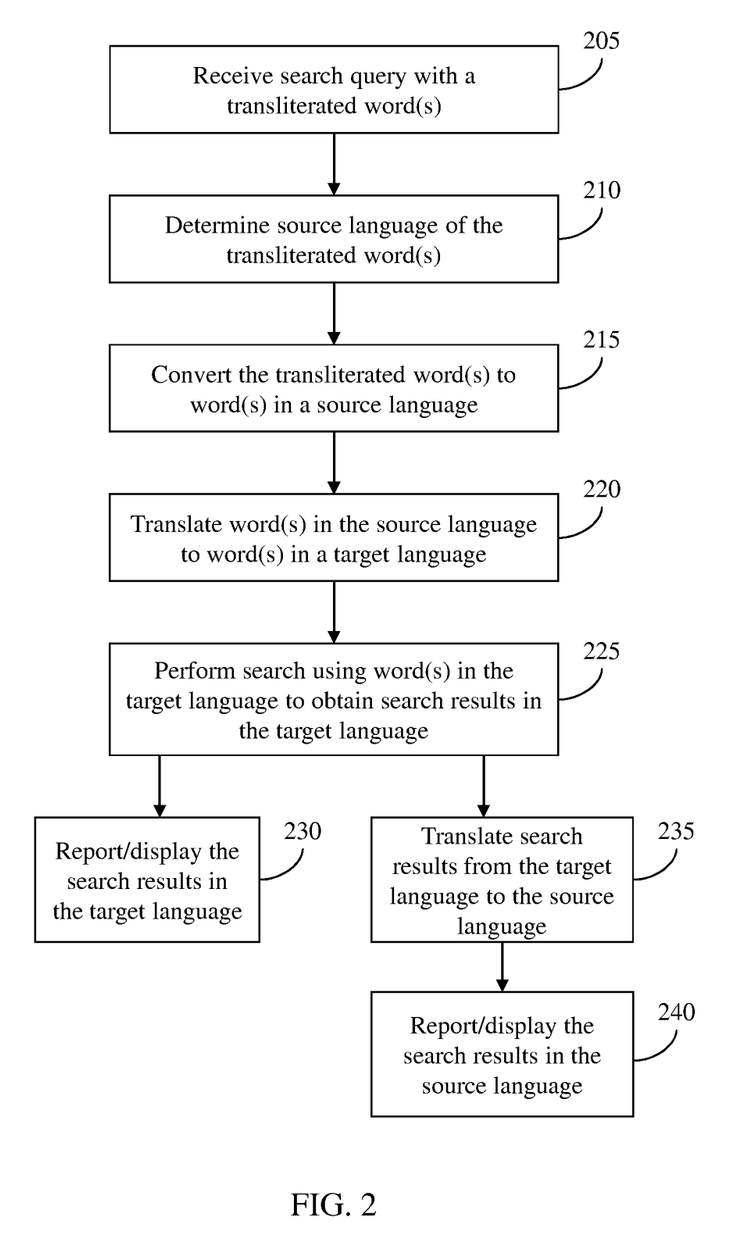
FIG. 2 shows a flow diagram for implementing steps in accordance with aspects of the invention.

FIG. 2 shows an exemplary flow for performing exemplary processes in accordance with aspects of the invention. The steps of FIG. 2 may be implemented in the environment of FIG. 1, for example.

The flowcharts and/or block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 2 depicts a process of performing a computer-based search initiated from a search query containing at least one transliterated word in accordance with aspects of the invention. At step 205, the system (e.g., translation engine 55 running on computing device 14) receives a search query that contains at least one transliterated word. For example, the translation engine may receive the search query from a user computer device (e.g., user computer device 60) at which a user has input the search query at a search engine portal. The search query may comprise, for example, a single transliterated word, plural transliterated words, or a mixture of at least one transliterated word and at least one non-transliterated word. The user may enter the search query in any suitable manner, such as typing, verbal dictation, or a combination of typing and verbal dictation. The user computer device may transmit the search query to the translation engine via network communication.

At step 210, the translation engine determines a source language of the transliterated word contained in the search query. For example, as described above with respect to FIG. 1, the translation engine may automatically determine the source language based on parameters including, but not limited to: correlation of user-entered words against language-specific dictionaries, environmental variables, location-based services, and user profiles and/or histories. When there is more than one transliterated word in the search query, the translation engine may determine a single source language for all the transliterated words, or may determine a different source language for each different transliterated word. In embodiments, the translation engine automatically determines the source language without the user having to designate the source language.

At step 215, the translation engine converts the transliterated word to a word in the source language, i.e., the source language determined at step 210. For example, as described above with respect to FIG. 1, the translation engine uses at least one of visually analogous transliteration principles and phonetically analogous transliteration principles to determine a word in the source language that corresponds to the user-input transliterated word.

At step 220, the translation engine translates the word in the source language (e.g., the word determined at step 215) to a word in a target language. In embodiments, the target language is a language in which the search engine is indexed. The translation engine may be configured to translate the word in the source language to the word in the target language using conventional translation techniques (e.g., language-to-language translation programming).

At step 225, the system performs the search using the word in the target language (e.g., the word determined at step 220). In embodiments, the translation engine transmits the word in the target language to a search engine (e.g., search engine 65 as described in FIG. 1), and the search engine performs the search in a conventional manner using the word in the target language as the search query. Step 225 also includes the search engine generating the search results in the target language, e.g., in a conventional manner. In situations where the search query (e.g., at step 205) contains a mixture of terms (e.g., the at least one transliterated word and at least one non-transliterated word), the translation engine re-creates the search query using the at least one non-transliterated word and the word in the target language (e.g., the word determined at step 220) to maintain the same context (e.g., order of words) as was presented in the original search query (e.g., at step 205).

At step 230, the search engine transmits the search results in the target language to the user computer device, and the user computer device displays the search results in the target language to the user. Alternatively, at step 235, the search engine transmits the search results in the target language to the translation engine, and the translation engine translates the search results to the source language (e.g., as determined at step 210). Then, at step 240, the translation engine transmits the search results in the source language to the user computer device, and the user computer device displays the search results in the source language to the user.

Figure 3:
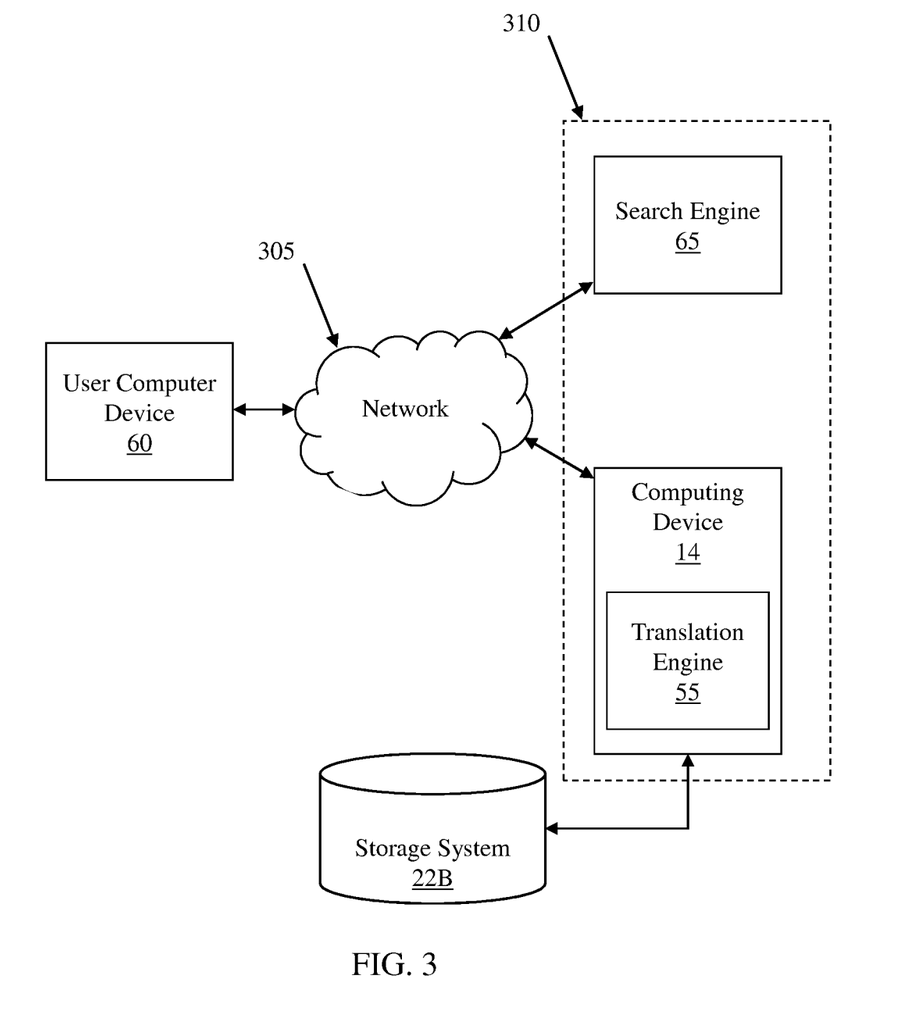
FIG. 3 shows a block diagram of a system in accordance with aspects of the invention.

FIG. 3 shows a block diagram of a system in accordance with aspects of the invention. In particular, FIG. 3 depicts the user computer device 60, the search engine 65, and the computing device 14 including the translation engine 55 all operatively connected via a communication network 305, such as the Internet. The translation engine 55 may be separate from the search engine 65. Alternatively, the translation engine 55 may be integrated with the search engine 65, as indicated by the dashed line 310 surrounding the two in FIG. 3. In embodiments, the translation engine 55 accesses data stored in storage system 22B when performing one or more of the processes described herein. Such data may include, for example, the language specific dictionaries for each of the plural candidate languages, the visually analogous transliteration data structures associated with each of the plural candidate languages, etc.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method implemented in a computer infrastructure, comprising:
    receiving a search query containing a transliterated word;
    determining a source language corresponding to the transliterated word, wherein the determining the source language comprises: determining a weighted score for each one of a plurality of candidate languages, and designating the candidate language with the highest weighted score as the source language;
    converting the transliterated word to a word in the source language;
    translating the word in the source language to a word in a target language; and
    performing a search using the word in the target language wherein the weighted score of each one of the plurality of candidate languages is based on:
        correlating user-entered words against language-specific dictionaries;
        environmental variables;
        location-based services; and
        user profile and/or history.

2. The method of claim 1, wherein the performing the search comprises submitting the word in the target language to an Internet search engine.

3. The method of claim 2, wherein the Internet search engine is indexed in the target language.

4. The method of claim 2, further comprising receiving search results from the Internet search engine based on the performing the search using the word in the target language.

5. The method of claim 4, wherein the search results are in the target language.

6. The method of claim 5, further comprising translating the search results, received from the Internet search engine, from the target language to the source language.

7. The method of claim 6, wherein the search query is received from a user computer device, and further comprising transmitting the translated search results in the source language to the user computer device.

8. The method of claim 1, wherein the determining the source language is performed automatically without a user specifying the source language.

9. The method of claim 1, wherein the converting the transliterated word to the word in the source language is based on visually analogous transliteration.

10. The method of claim 9, wherein the visually analogous transliteration comprises comparing a shape of a letter of the transliterated word to a shape of a letter in the source language.

11. The method of claim 1, wherein the converting the transliterated word to the word in the source language is based on a combination of visually analogous transliteration and phonetically analogous transliteration.

12. The method of claim 1, wherein the search query contains the transliterated word and a non-transliterated word.

13. The method of claim 1, wherein the transliterated word comprises a first transliterated word and the search query contains a second transliterated word, and further comprising:
    determining a second source language corresponding to the second transliterated word;
    converting the second transliterated word to a word in the second source language;
    translating the word in the second source language to a second word in the target language; and
    performing the search using the word in the target language and the second word in the target language.

14. The method of claim 1, wherein a service provider at least one of creates, maintains, deploys and supports the computer infrastructure.

15. The method of claim 1, wherein steps of claim 1 are provided by a service provider on a subscription, advertising, and/or fee basis.

16. A system implemented in hardware, comprising:
    a processor executing a translation engine that is operable to:
        receive a search uer containin [7] a transliterated word;
        determine a source language corresponding to the transliterated word, wherein the determining the source language comprises: determining a weighted score for each one of a plurality of candidate languages, and designating the candidate language with the highest weighted score as the source language;
        convert the transliterated word to a word in the source language;
        translate the word in the source language to a word in a target language;
        submit the word in the target language to an Internet search engine that is indexed in the target language;
        receive search results in the target language, wherein the search results are based on the submitting the word in the target language to the Internet search engine; and
        translate the search results, received from the Internet search engine, in the target language to search results in the source language,
    wherein the weighted score of each one of the plurality of candidate languages is based on:
        correlating user-entered words against language-specific dictionaries;
        environmental variables;
        location-based services; and
        user profile and/or history.

17. A system implemented in hardware, comprising:
    a processor executing a translation engine that is operable to:
        receive a search query containing a transliterated word;
        determine a source language corresponding to the transliterated word, wherein the determining the source language comprises: determining a weighted score for each one of a plurality of candidate languages, and designating the candidate language with the highest weighted score as the source language;
        convert the transliterated word to a word in the source language;
        translate the word in the source language to a word in a target language;
        submit the word in the target language to an Internet search engine that is indexed in the target language;
        receive search results in the target language, wherein the search results are based on the submitting the word in the target language to the Internet search engine; and translate the search results, received from the Internet search engine, in the target language to search results in the source language,
wherein the converting the transliterated word to the word in the source language is based on visually analogous transliteration that comprises comparing a shape of a letter in the transliterated word to shapes of letters in the determined source language.

18. A computer program product comprising a computer readable hardware storage device having readable program code embodied in the storage device, the computer program product includes at least one component operable to:
receive a search query from a user computer device, wherein the search query contains a transliterated word;
determine a source language corresponding to the transliterated word, wherein the determining the source language comprises: determining a weighted score for each one of a plurality of candidate languages, and designating the candidate language with the highest weighted score as the source language;
convert the transliterated word to a word in the source language;
translate the word in the source language to a word in a target language;
submit the word in the target language to a search engine;
receive search results in the target language based on the submitting;
translate the search results in the target language to search results in the source language; and
transmit the search results in the source language to the user computer device,
wherein the converting the transliterated word to the word in the source language is based on visually analogous transliteration that comprises comparing a shape of a letter in the transliterated word to shapes of letters in the determined source language; and
the determining the weighted score for each one of the plurality of candidate languages is based on at least two of: correlating user-entered words against language-specific dictionaries; environmental variables; location-based services; and user profile and/or history.

19. A computer system for translating a transliterated search query, the system comprising:
a CPU, a computer readable memory, and a computer readable storage media;
first program instructions to receive a search query containing a transliterated word;
second program instructions to convert the transliterated word to a word in a source language;
third program instructions to translate the word in the source language to a word in a target language;
fourth program instructions to submit the word in the target language to a search engine that is indexed in the target language; and
fifth program instructions to receive search results in the target language based on the submitting;
wherein the first, second, third, fourth, and fifth program instructions are stored on the computer readable storage media for execution by the CPU via the computer readable memory;
the source language is determined by determining a weighted score for each one of a plurality of candidate languages and designating the candidate language with the highest weighted score as the source language, wherein the weighted score is based on: correlating user-entered words against language-specific dictionaries; environmental variables; location-based services; and user profile and/or history; and
the converting the transliterated word to the word in the source language is based on visually analogous transliteration that comprises comparing a shape of a letter in the transliterated word to shapes of letters in the determined source language.

* * * * *